United States Patent [19]
Valente

[11] Patent Number: 6,076,429
[45] Date of Patent: Jun. 20, 2000

[54] CLUTCH FOR A DIFFERENTIAL

[75] Inventor: Paul J. Valente, Berkley, Mich.

[73] Assignee: Tractech Inc., Warren, Mich.

[21] Appl. No.: 09/262,025

[22] Filed: Mar. 4, 1999

[51] Int. Cl.$^7$ .................................................. F16H 48/24
[52] U.S. Cl. ............................................ 74/650; 192/69.8
[58] Field of Search .............................. 74/650; 192/69.8

[56] References Cited

U.S. PATENT DOCUMENTS

| | | |
|---|---|---|
| 4,424,725 | 1/1984 | Bawks . |
| 5,067,935 | 11/1991 | Brown et al. . |
| 5,524,509 | 6/1996 | Dissett . |
| 5,590,572 | 1/1997 | Valente . |
| 5,947,252 | 9/1999 | Ziech ...................... 192/69.8 X |

*Primary Examiner*—Khoi Q. Ta
*Attorney, Agent, or Firm*—Laubscher & Laubscher

[57] ABSTRACT

A differential mechanism of the holdout ring type is characterized by improved annular clutch plates with trapezoidally configured cam teeth for mating with the center cam teeth of the center cam. Each clutch plate has inner cam and outer clutch teeth extending from a planar surface thereof with a gap between the inner and outer teeth receiving a holdout ring. The inner cam teeth have a base wider than the top portion thereof so that there is surface to surface contact with the center cam teeth. This reduces torque in the clutch cam teeth and provides smoother operation and a longer service life to the differential.

12 Claims, 3 Drawing Sheets

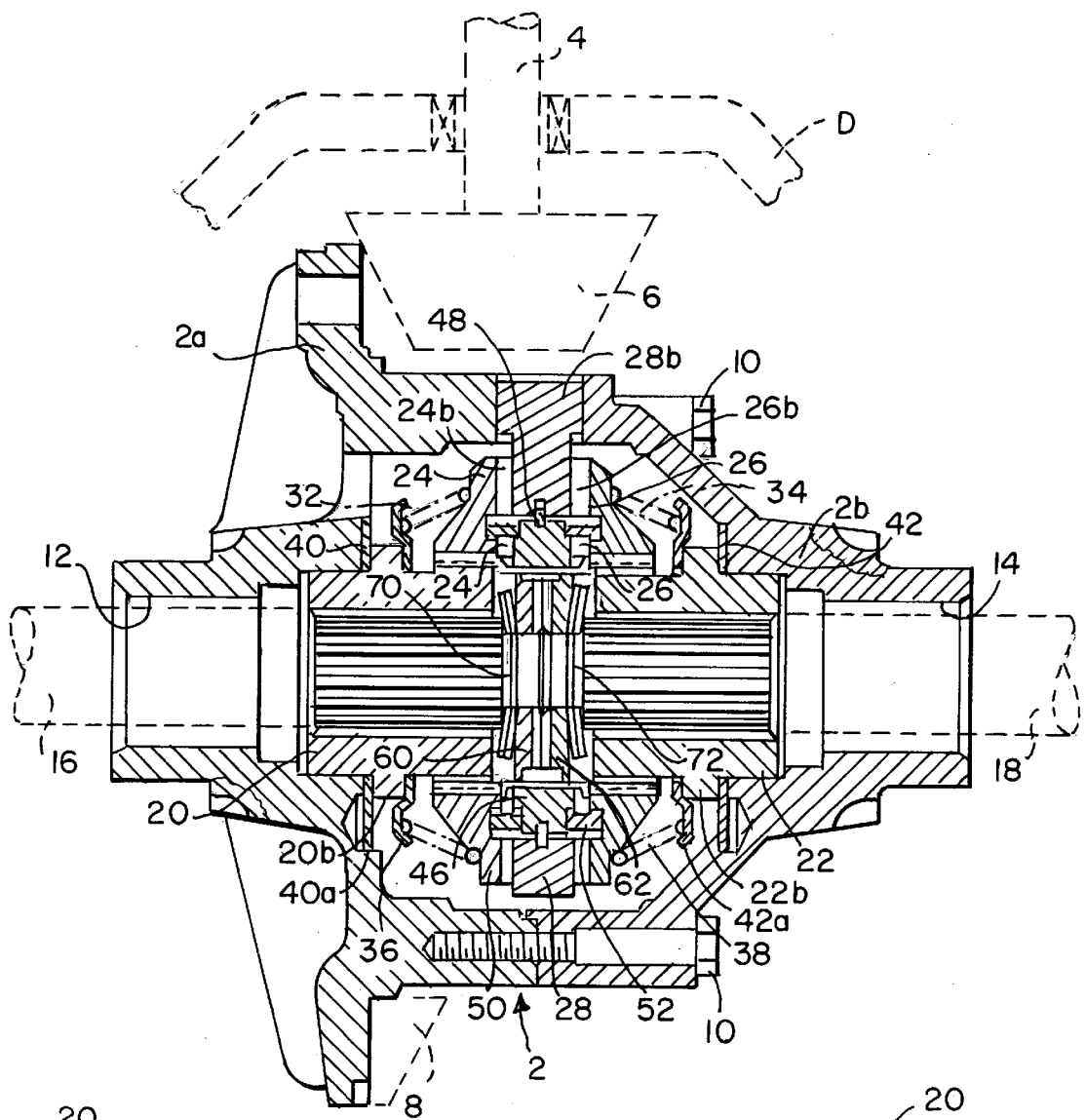
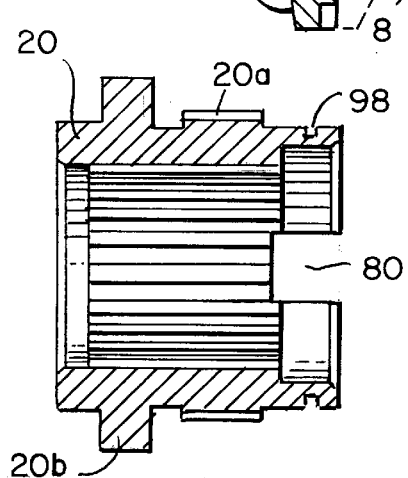
FIG. 2
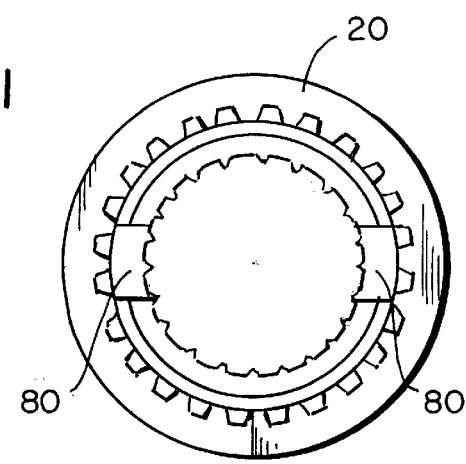
FIG. 3

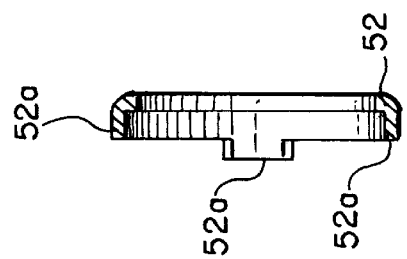
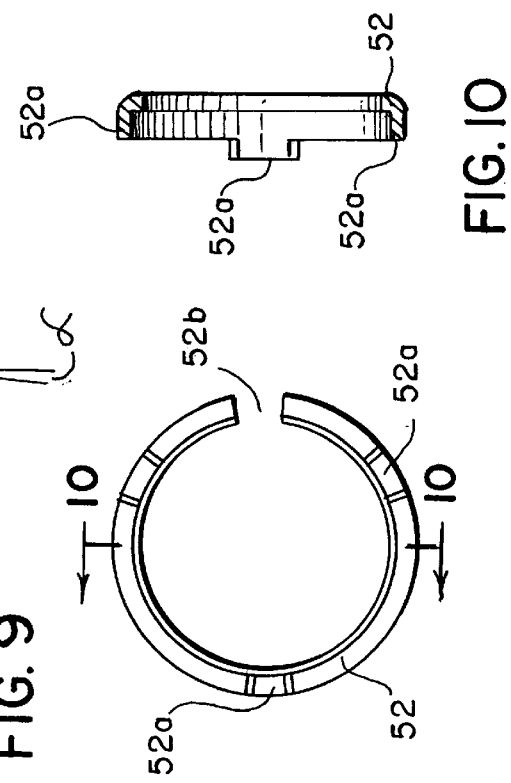
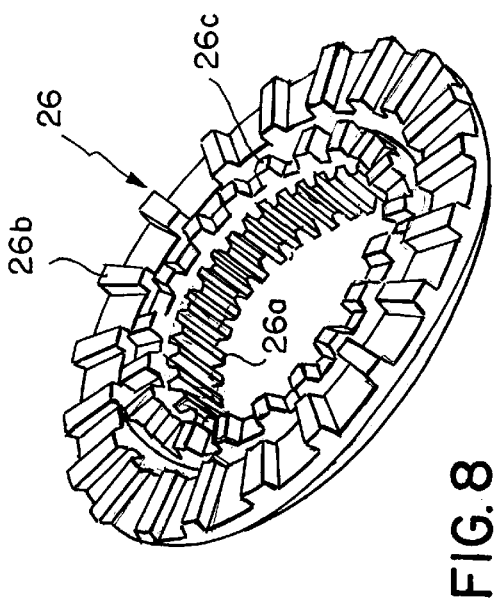
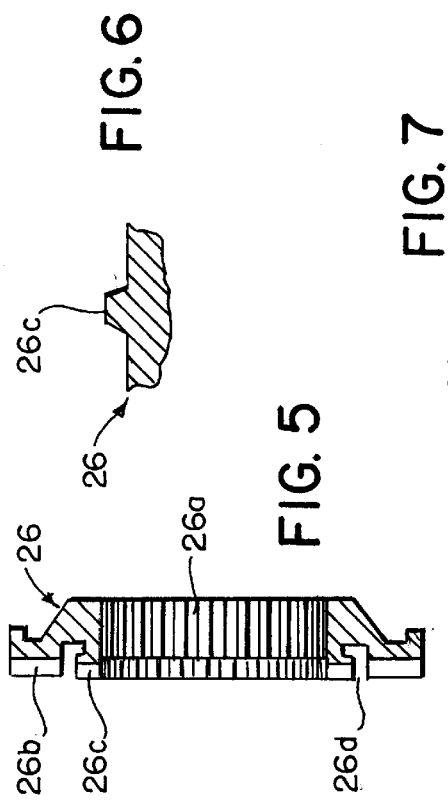
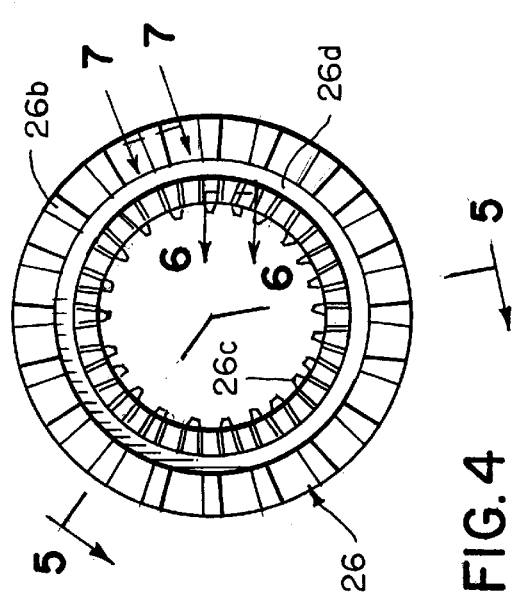

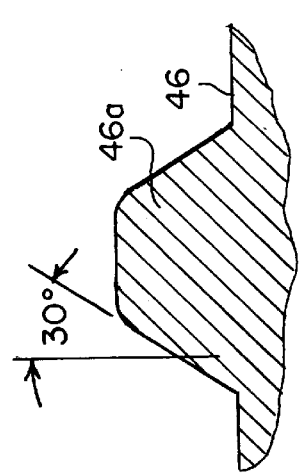
FIG. 13
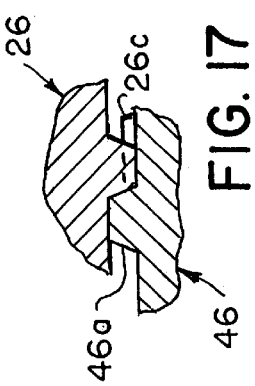
FIG. 17
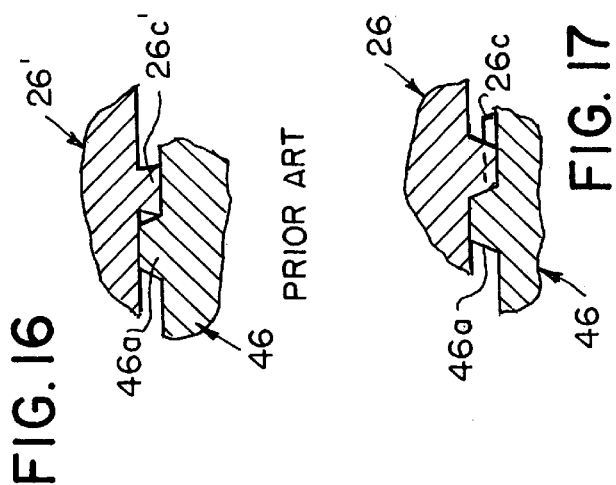
FIG. 16 PRIOR ART
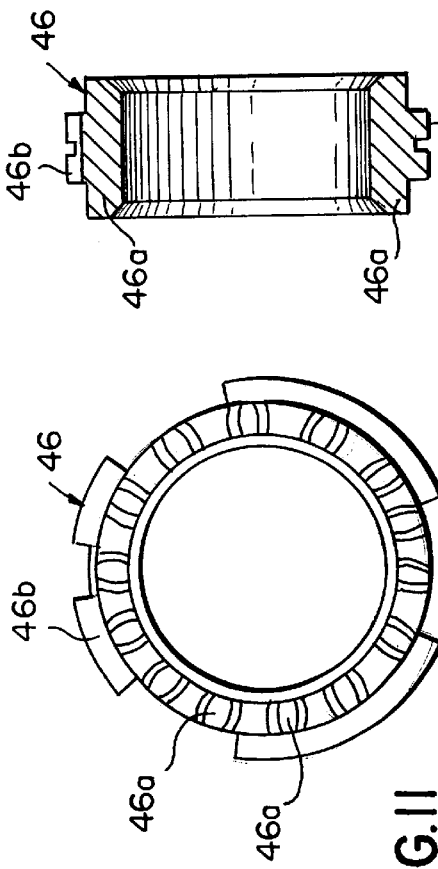
FIG. 12
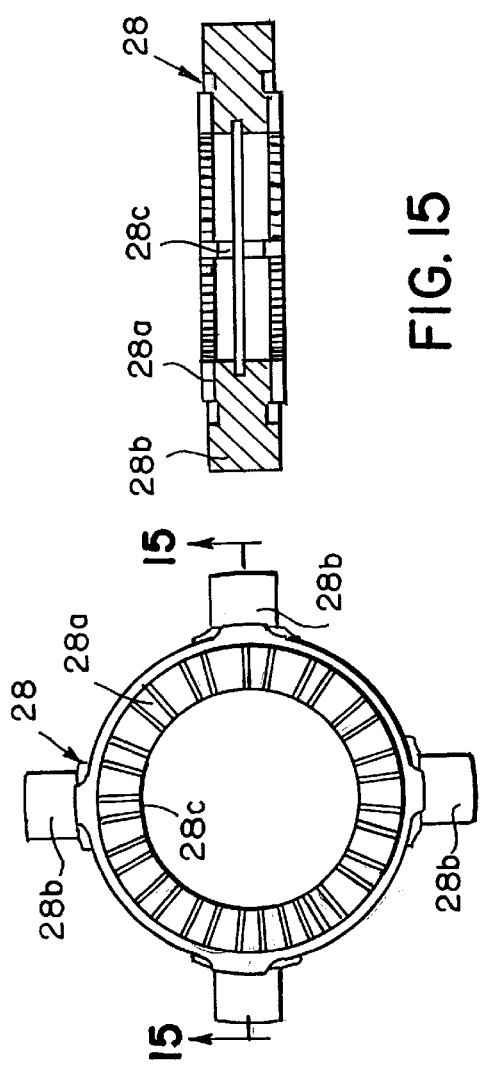
FIG. 15
FIG. 11
FIG. 14

CLUTCH FOR A DIFFERENTIAL

BACKGROUND OF THE INVENTION

The present invention relates to an improved clutch member for a differential mechanism for rotatably driving a pair of aligned axially-spaced output shafts from a rotatably driven input shaft. The inner teeth of the clutch are configured to more accurately mate with the teeth of a cam member of the differential to provide smoother operation and a longer service life of the differential.

BRIEF DESCRIPTION OF THE PRIOR ART

Differential mechanisms of the holdout ring type are well known in the patented prior art as evidenced by the Dissett U.S. Pat. No. 5,524,509 which is owned by the assignee of the present invention. As disclosed in the Dissett patent, upon the overrunning of one output shaft relative to the other, the driven clutch member associated with the overrunning shaft is disengaged from the center driving member by a center cam member, an associated holdout ring being rotated slightly from an inoperative position to an operative position to maintain the driven clutch member disengaged until the overrunning condition is terminated.

While the prior differential mechanisms operate satisfactorily, the inner teeth are prone to failure because they do not conform with the configuration of the cam teeth with which they engage. The cam teeth normally have a positive angle while the clutch teeth have a negative angle resulting from their dovetail configuration. This creates torque in the lower, narrower portion of the clutch inner teeth and they thus have a tendency to shear away from the clutch member.

The present invention was developed in order to overcome these and other drawbacks of prior clutch plates for differentials by providing clutch plates with inner teeth which are configured to mate with the cam teeth along the side surfaces of the teeth for smoother operation and longer service life.

SUMMARY OF THE INVENTION

Accordingly, it is a primary object of the invention to provide an improved clutch member in a differential mechanism for rotatably driving a pair of aligned axially-spaced output shafts from a rotatably driven input shaft and including a center driving member for the output shafts and a center cam for disengaging an overrunning output shaft from the center driving member. The improved clutch is an annular member having outer and inner diameters and a pair of planar surfaces, one of which contains first and second groups of spaced teeth adjacent to the outer and inner diameters, respectively. The first teeth are clutch teeth that engage corresponding clutch teeth on the center drive member. The second teeth are cam teeth that engage the cam teeth on the center cam of the differential and have a trapezoidal cross-sectional configuration with the base portion being wider than the top portion. Because the second clutch cam teeth have a trapezoidal configuration matching that of the teeth of the center cam, the center cam teeth are engaged along the side surface of the clutch cam teeth and torque in the clutch cam teeth is minimized.

According to another object of the invention, the first clutch teeth have a dovetail cross-sectional configuration corresponding with the clutch teeth on the center drive member.

BRIEF DESCRIPTION OF THE FIGURES

Other objects and advantages of the invention will become apparent from a study of the following specification, when viewed in the light of the accompanying drawing, in which:

FIG. 1 is a sectional view of the differential mechanism of the present invention;

FIGS. 2 and 3 are longitudinal sectional views and end views, respectively, of one of the side gears of FIG. 1;

FIG. 4 is an end view of one of the clutch members of FIG. 1

FIG. 5 is a sectional view taken along line 5—5 of FIG. 4;

FIG. 6 is a sectional view taken along line 6—6 of FIG. 4;

FIG. 7 is a sectional view taken along line 7—7 of FIG. 4;

FIG. 8 is a perspective view of the clutch member of FIG. 4;

FIG. 9 is an end view of one of the holdout rings of FIG. 1;

FIG. 10 is a sectional view taken along line 10—10 of FIG. 9;

FIGS. 11 and 12 are end and sectional views, respectively of the cam member of FIG. 1;

FIG. 13 is a detailed sectional view of one of the cam teeth of the cam member of FIG. 11;

FIG. 14 is an end view of the central driving member of FIG. 1;

FIG. 15 is a sectional view taken along line 15—15 of FIG. 14; and

FIGS. 16 and 17 are partial sectional views showing the engagement of the clutch cam teeth with the center cam teeth according to the prior art and to the present invention, respectively.

DETAILED DESCRIPTION

Referring first more particularly to FIG. 1, the differential mechanism of the present invention includes a sectional housing 2 that is rotatably driven within the axle case D by the vehicle drive shaft 4 via drive pinion 6 and ring gear 8. The housing includes two sections 2a and 2b that are bolted together by bolt means 10. At opposite ends, the housing includes opposed openings 12 and 14 for receiving the driven left and right wheel shafts 16 and 18, respectively, and side gears 20 and 22 (FIGS. 2 and 3) are non-rotatably splined to the adjacent ends of the wheel shafts 16 and 18, respectively.

Annular clutch members 24 and 26 (FIGS. 4–8) are slidably mounted for axial displacement on the side gears 20 and 22 via splines 24a and 26a adjacent to the inner diameter thereof. The clutch members have first clutch teeth 24b and 26b on a planar face adjacent the outer diameter that engage corresponding clutch teeth 28a (FIGS. 15 and 16) on the central driving member 28. respectively. The central driving member 28 is non-rotatably connected with the housing 2 by means of radial projections 28b that are retained between the sections 2a and 2b of the housing 2. The clutch members are normally biased toward each other on opposite sides of the center drive member 28 by compression springs 32 and 34, respectively. At their remote ends, the springs 32 and 34 engage spring retainer members 36 and 38, respectively, that are mounted concentrically on the side gears in abutting engagement with peripheral circumferentially extending side gear rib portions 20b and 22b, respectively. The remote sides of the circumferential rib portions 20b and 22b of the side gears 20 and 22 engage thrust washers 40 and 42, respectively, that are captured and non-rotatably supported by the housing 2.

Arranged concentrically within the central drive member 28 is an annular cam member 46 that is keyed against axial displacement relative to the central driving member by a split lock washer 48. The cam member 46 is provided at each end with center cam teeth 46a (FIGS. 11–13) that engage corresponding clutch cam teeth 24c and 26c (FIGS. 4–8) arranged on the adjacent faces and adjacent to the inner diameters of the clutch members 24 and 26. respectively.

As shown in FIGS. 7, the first or outer plurality of clutch teeth 26b on the clutch member 26 have a dovetail configuration where the side edges of the teeth converge toward the center of the annulus at a negative angle . These clutch teeth mate with those of the center driver 28 which also have a negative angle. The negative angle is necessary on both the center driver 28 and the outer clutch teeth 26b to hold the teeth together while transferring torque.

As shown in FIG. 13, the teeth 46a on the center cam 46 have a positive angle of approximately 30° to force the clutch out of engagement during the overrunning mode. In the prior clutch member 26' shown in FIG. 16, the inner cam teeth 26c' of the clutch have the same negative angle as the outer clutch teeth. This results in a non-ideal contact area between the clutch and cam teeth. That is, the contact area is small and at the end of the clutch cam tooth 26c as shown in FIG. 16 creating torque about the weak base of the clutch cam tooth. Most failures in the differentials of the prior art occur due to the inner teeth shearing off.

In the new clutch of the invention, the inner cam teeth 26c of the clutch have a trapezoidal configuration as shown in FIG. 6 with the base of each tooth being wider than the top portion thereof The clutch cam teeth 26c thus have a positive angle to match the positive angle of the center cam teeth 46a as shown in FIG. 17. This configuration eliminates loading of the clutch cam tooth at its tip and spreads the load out across the entire tooth face. This not only reduces the likelihood of the clutch cam tooth being twisted off but also lowers the surface pressure between the two cam teeth making the clutch less likely to dig into the center cam tooth as sometimes occurs with relatively soft center cams. It also provides the differential with a smoother, less erratic feel to the vehicle operator. In addition, the inner cam teeth of the clutch are much stronger because they are wider at the base.

As shown in FIG. 4, the inner cam 26c and outer clutch 26b teeth of the annular clutch member 26 extend radially from one planar face of the member with each outer tooth being aligned with but spaced from a corresponding inner tooth. The space defines a circular gap 26d between the inner and outer teeth.

The gaps in the clutch members 24, 26 receive resilient holdout rings 50 and 52 for maintaining an overrunning clutch member in a disengaged condition, as will be described in greater detail below. As shown in FIGS. 9 and 10, the holdout ring 52 is provided with a plurality of circumferentially-spaced holdout lugs 52a that extend axially toward the central lug projections 46b (FIG. 11) arranged on the periphery of the center cam 46 as is known in the art. The holdout ring 52 contains a slot 52b that receives the internal lug 28c (FIGS. 14 and 15), thereby limiting the extent of angular displacement of the holdout ring relative to the central driver member. Holdout ring 50 contains a similar slot for receiving the internal lug 28c.

Each of the spring retaining members 36 and 38 are provided on its inner periphery with spline teeth that correspond generally with the external spline teeth on the adjacent end of the side gears 20 and 22. respectively, thereby to permit initial axial mounting of the spring retainer members on the associated side gears, respectively.

A pair of annular thrust block members 60 and 62 are arranged in contiguous engagement concentrically within the center cam member 46. The adjacent face of the thrust block members 60 and 62 contain radially extending lubrication grooves and the remote faces of the thrust blocks are engaged by sets of Belleville disc-spring washers 70 and 72, respectively. The remote ends of the sets of Belleville washers are received by counterbore portions 20b and 22b, contained in the adjacent ends of the side gears 20 and 29. respectively. The thrust blocks are non-rotatably connected with the associated side gears by means of pairs of diametrically arranged radially outwardly extending projections that are received in corresponding pairs of diametrically arranged axially extending slots (not shown) contained in the adjacent ends of the side gears 20 and 22, respectively.

The thrust washers 40 and 42 arranged at the remote ends of the side gears 20 and 22 are formed of hardened steel and include diametrically opposed radially outwardly extending tab portions 40a and 42a that are received within corresponding recesses contained in the adjacent end walls of the housing chamber, thereby to capture and prevent rotation of the thrust washers relative to the housing 2. The face of the thrust washer 40 adjacent the rib portion 20b of side gear 20 contains an elliptical lubrication groove. Thrust washer 42 contains a similar elliptical lubrication groove.

In order to retain the thrust block members 60 and 62 on the corresponding side gears 20 and 22. respectively, split resilient retaining rings are provided that are snapped within corresponding locking grooves contained in the outer peripheral surfaces of the adjacent ends of the side gears (as shown, for example, by the groove 98 in FIG. 2).

OPERATION

During normal driving conditions, the wheel shafts 16 and 18 are driven at the same speed by drive shaft 4 via pinion 6, ring gear 8, center drive member 28, clutch members 24 and 26, and side gears 20 and 22.

Assume now that the vehicle commences a left-hand turn. whereupon the rotational velocity of the right wheel shaft 19 exceeds that of the left wheel shaft 16. Owing to the profiles of the cooperating cam teeth 46a of the center cam member 46 and the cooperating clutch cam teeth 26c of the right clutch member 26, the clutch member is cammed out to the right against the restoring forces of biasing spring 34, thereby to disengage the clutch teeth 26b of the clutch member from the corresponding clutch teeth 28a of the central driving member 28. The right wheel shaft 18 is now free for rotation at a higher rotational velocity than the left wheel shaft 16 during the left turn of the vehicle. Owing to the biasing of the side gear members outwardly apart by the Belleville sets of washers, the chattering normally expected from such overrunning differentials is alleviated, whereby the noise level is significantly reduced. The right wheel shaft is maintained in a disengaged condition by the angularly displaced holdout ring 52 as long as the overrunning shaft condition exists. When the turn is completed and the output wheel shafts are again generally at the same rotational velocity, spring 34 biases clutch spring 26 to the left toward the engaged position relative to the centering driving member 28. The differential mechanism then resumes its initial non-overrunning driving condition.

Although one embodiment of the invention has been illustrated and described as including sets of Belleville washers serving as the means for biasing the side gears outwardly apart into engagement with the thrust washers, it is contemplated that other resilient biasing means—such as compression springs, tension springs, resilient bodies, and the like—might be used as well.

While in accordance with the provisions of the patent statute of the preferred forms and embodiments of the invention have been illustrated and described, it will be apparent to those of ordinary skill in the art that various changes and modifications may be made without deviating from the inventive concepts set forth above.

What is claimed is:

1. In a differential mechanism for rotatably driving a pair of aligned axially-spaced output shafts from a rotatably driven input shaft and including a center driving member for the output shafts and a center cam having cam teeth for disengaging an overrunning output shaft from the center driving member, an improved clutch mechanism comprising:

(a) an annular clutch member having an inner and an outer diameter and a pair of planar surfaces, one of said planar surfaces containing:
      (1) a plurality of spaced first clutch teeth arranged adjacent said outer diameter for engagement with corresponding clutch teeth on the center drive member of the differential; and
      (2) a plurality of spaced second cam teeth arranged adjacent to said inner diameter for engagement with corresponding cam teeth on the center cam of the differential, said second cam each having a trapezoidal cross-sectional configuration with a base portion being wider than a top portion thereof, whereby said second cam teeth engage the center cam teeth along a side surface thereof to reduce torque in said second teeth.

2. A clutch mechanism as defined in claim 1, wherein said first teeth have a dovetail cross-sectional configuration.

3. A clutch mechanism as defined in claim 2, wherein said second and first teeth extend radially on said one planar surface.

4. A clutch mechanism as defined in claim 3, wherein said second teeth are spaced from said first teeth, thereby to define a circular gap between said first and second teeth for receiving a holdout ring of the differential.

5. A clutch mechanism as defined in claim 4. wherein said clutch member contains a plurality of parallel splines on an inner radial surface thereof.

6. A clutch mechanism as defined in claim 1, wherein said second cam teeth have side walls arranged at an angle corresponding with the angle of the side walls of the center cam teeth of the cam.

7. A differential mechanism for rotatably driving a pair of aligned axially-spaced output shafts from a rotatably driven input shaft, comprising:

(a) a housing containing an internal chamber, said housing including a first pair of opposed openings communicating with said chamber for receiving said output shafts, respectively;

(b) a pair of aligned annular axially-spaced side gears arranged within said housing chamber adjacent said first pair of openings for non-rotatable connection with said output shafts, respectively;

(c) an annular center driving member rigidly connected with said housing at its outer periphery, said driving member being arranged between and in axially-spaced relation to the adjacent ends of said side gears and including teeth on a surface thereof;

(d) clutch means normally connecting said center driving member with said side gears, respectively, said clutch means including a pair of annular clutch members mounted for axial displacement on said side gears on opposite sides of said center driving member, said clutch members being normally spring-biased inwardly together toward engaged positions relative to said center driving member, said clutch members each having an inner and an outer diameter and a pair of planar surfaces, one of said planar surfaces containing:
      (2) a plurality of spaced first clutch teeth arranged adjacent said outer diameter for engagement with said teeth on said center drive member;
      (2) a plurality of spaced second cam teeth arranged adjacent said inner diameter and having a trapezoidal cross-sectional configuration with a base portion being wider than a top portion thereof; and (e) cam means including trapezoidal center cam teeth on a surface thereof for normally engaging said second cam teeth along a side surface thereof, said cam means being operable when one output shaft overruns the other by a predetermined amount for axially disengaging said clutch member associated with the overrunning shaft from said center driving member; and (f) holdout ring means for maintaining said overrunning clutch member in the disengaged condition as long as the output shaft associated therewith is in the overrunning condition.

8. A differential mechanism as defined in claim 7, wherein first teeth of said clutch members have a dovetail cross-sectional configuration.

9. A differential mechanism as defined in claim 8, wherein said second cam and first clutch teeth on each of said clutch members extend radially on said one planar surface.

10. A differential mechanism as defined in claim 9, wherein said second cam teeth are spaced from said first clutch teeth, thereby to define a circular gap between said first and second teeth for receiving said holdout ring.

11. A differential mechanism as defined in claim 10, wherein said clutch members contain a plurality of parallel splines on an inner radial surface thereof.

12. A differential mechanism as defined in claim 7, wherein said second cam teeth have side walls arranged at an angle corresponding with the angle of the side walls of said center cam teeth.

* * * * *